United States Patent

Reulecke et al.

[15] 3,650,691
[45] Mar. 21, 1972

[54] METHOD OF PURIFYING A PHOSPHORIC ACID HYDROLYZING SOLUTION

[72] Inventors: Wilhelm Reulecke, Bensberg; Toni Litzenburger, Bergisch-Gladbach; Otto Winter, Bergisch-Gladbach-Sand, all of Germany

[73] Assignee: Klockner-Humboldt-Deutz Aktiengesellschaft, Cologne, Mulheim, Germany

[22] Filed: Oct. 5, 1970

[21] Appl. No.: 77,923

[30] Foreign Application Priority Data

Feb. 10, 1967 Germany..............................K 61389

[52] U.S. Cl..................................................23/165, 23/107
[51] Int. Cl. ..........................................................C01b 25/18
[58] Field of Search................................23/165, 165 C, 107

[56] References Cited

UNITED STATES PATENTS

| 137,635 | 4/1873 | Storck et al.............................23/165 |
| 2,707,670 | 5/1955 | Munekata et al.......................23/193 |
| 2,567,227 | 9/1951 | Miller......................................23/109 |
| 3,161,466 | 12/1964 | Fallin......................................23/109 |
| 3,374,055 | 3/1968 | Villalon..................................23/107 |
| 3,494,735 | 2/1970 | Cochran..................................23/165 |

Primary Examiner—Oscar R. Vertiz
Assistant Examiner—Gregory A. Heller
Attorney—Singer, Stern & Carlberg

[57] ABSTRACT

A phosphoric acid solution for hydrolysis of rock phosphate is purified by neutralizing it with a base pH 3.3 to 5.5, thereby causing impurities such as iron and aluminum phosphates to precipitate. After removal of impurities, the solution is brought together with a cationic ion-exchange resin, in hydrogen form, to regenerate highly pure phosphoric acid.

5 Claims, 1 Drawing Figure

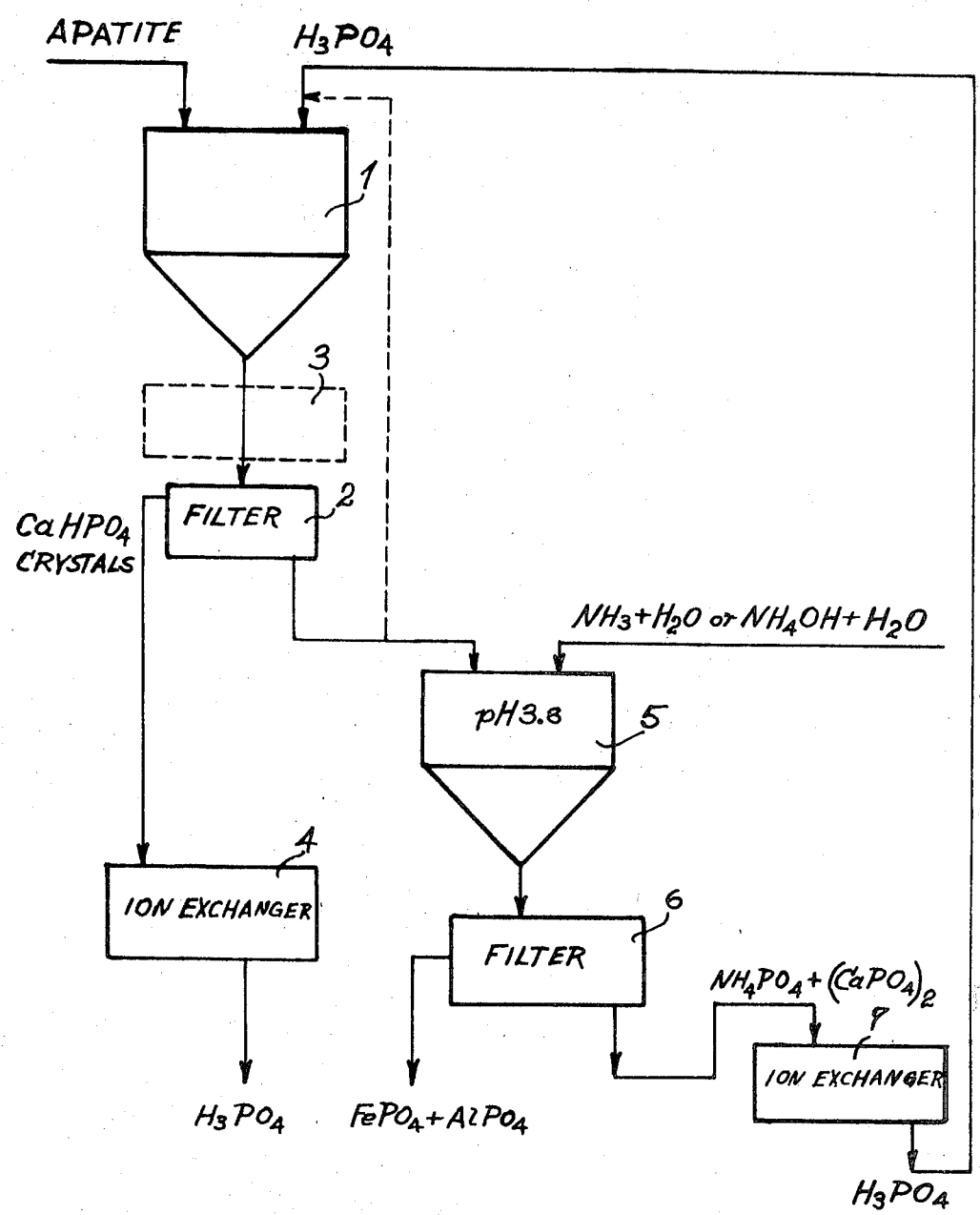

METHOD OF PURIFYING A PHOSPHORIC ACID HYDROLYZING SOLUTION

The invention relates to a method of purifying a phosphoric acid hydrolyzing solution and is a continuation-in-part of U.S. Pat. application Ser. No. 702,832, filed on Feb. 5, 1968 now abandoned.

For numerous uses phosphoric acid is desired to be in a particularly pure condition, as for instance in the food processing industry and the cleansing agent industry. There have been proposed heretofore several methods for removing the impurities in different ways. Difficulties are particularly encountered in removing cationic impurities, such as iron and aluminum, which even in an ion exchanger cannot be removed completely.

A method is known (U.S. Pat. No. 3,494,735) for producing phosphoric acid in which rock phosphate (apatite) is digested with phosphoric acid to form crystalline monocalcium orthophosphate and a mother liquor; the monocalcium orthophosphate is separated and converted to phosphoric acid by means of a strongly acidic cationic ion-exchange resin. The mother liquor from the crystalline monocalcium orthophosphate is rich in dissolved impurities which were contained in the apatite. Since the mother liquor will be used again for hydrolysis, the impurities or at least a part of them must be removed prior to reuse.

For this purpose, according to the invention, the mother liquor from the monocalcium orthophosphate or a portion thereof is neutralized to a pH-value of 3.3 to 5.5, preferably 3.8 to 4, whereby iron and aluminum phosphates are precipitated and are separated by filtration. The remaining solution contains ammonium ions or ions of some other base used for neutralizing. These ions are removed in a cationic ion exchanger charged with a strongly acidic cationic ion-exchange resin of the sulfonic acid type. Such resins are described in U.S. Pat. Nos. 2,191,853, 2,366,007 and 2,518,420, some useful commercially available resins are Duolite C-20, Amberlite 1 R-120, Walfatit P, and Zeo Karb.

According to the invention, the percentage of the impurities in the circulating phosphoric acid solution is selected to be relatively high so that a purification of only a small portion of that solution is sufficient to eliminate the impurities added during each round trip.

The invention is shown in greater detail with reference to the accompanying drawing.

In accordance with the drawing the phosphate-containing materials, in the present case apatite, together with phosphoric acid, are introduced into a container 1, which in practice is suitably provided with an agitator. In this container, the phosphate-containing material is hydrolyzed with the aid of the phosphoric acid at an increased temperature, that is, until insoluble portions of the apatite, such as $SiO_2$, are dissolved. By means of the hydrolysis, the tricalcium phosphate of the apatite is converted into monocalcium orthophosphate. The latter is crystallized out, and together with the insoluble portions is separated from the mother liquor in a filter 2 connected in series with the container 1. In practice, there is connected between container 1 and filter 2 a container 3 shown in dash lines in the drawing, in which the crystallizing-out step of the monocalcium orthophosphate present in the solution may be completed. The monocalcium phosphate crystals occurring in the filter 2 are suitably, after the previous solubilization by means of water, conveyed to an ion exchanger 4 charged with a cationic ion-exchange resin of sulfonic acid type and converted in the same to phosphoric acid. These steps of the method just indicated belong to the state of the art. To this known method, the method according to the present invention is now added.

In accordance with the present invention, the pH value of the solution separated from the monocalcium phosphate crystals in the filter 2 is increased in a container 5 with the aid of basic reagents ($NH_3$ and $H_2O$ or $NH_4OH$ and $H_2O$) to 3.8. In this connection, the iron and aluminum phosphates as well as the organic impurities, which are retained adsorptively by the phosphates, are precipitated. These compounds precipitated in the solution are subsequently separated from the solution in a filter 6 which is connected in series with the container 5, while the filtrate which contains ammonium phosphate and calcium phosphate, is conveyed to a cation exchanger 7 charged with a strongly acidic cationic ion-exchange resin of a sulfonic acid type, such as Amberlite 1 R-120, Duolite C-20, Wolfatit P, and Zeo Karb. The resin is used in the hydrogen form and is regenerated when spent by mineral acids such as sulfuric acid in the conventional manner.

The phosphoric acid recovered in this manner is now introduced for the hydrolysis of the phosphate-containing substances into the container 1.

In accordance with the method of the invention, there takes place accordingly very advantageously a regeneration of the solution conveyed back into the container 1 with simultaneous recovery of the essential phosphate portions in the solution, in the form of phosphoric acid, which is used for the renewed hydrolysis of phosphate-containing substances. The liquor coming from filter 2 is conveyed practically in a circular path and thereby is continuously freed from undesired foreign substances. Whether in this way the entire solution coming from the filter 2 or only a portion of the same is to be subjected to a purification or regeneration, respectively, depends in each case upon the impurities present in the material introduced, particularly, on the iron and aluminum portions. The method in accordance with the invention may, however, be adapted very easily by means of alterations of the quantity of partial flow to the conditions present in each instance. In the case that only a part of the liquor from filter 2 is to be subjected to a purification, the remaining part is returned directly to the container 1 (shown in the drawing in dash lines). Under ordinary operating conditions, a sufficient proportion of the mother liquor is subjected to purification to maintain a balance between the impurities derived from the rock phosphate and those removed from the monocalcium orthophosphate mother liquor. After adjustment of the proportions of the purified and nonpurified liquors, it may be advantageous to adjust the phosphoric acid content of the liquor in container 1 to obtain optimum dissolving capacity. In this way almost all of the phosphates of the phosphate rock are utilized for the continuous production of phosphoric acid. The process is illustrated further by the following example.

EXAMPLE

As a starting material was used a solution obtained from the hydrolysis of apatite by means of phosphoric acid and the subsequent removing therefrom of monocalcium-hydrogenphosphate crystals by crystallization. This solution is used again for hydrolysis of apatite according to a known method of producing phosphoric acid. Thus the solution circulates and on its course becomes enriched with soluble impurities consisting substantially of iron and aluminum phosphates. Therefore, a portion of this circulating solution has to be purified and that portion is so selected that in the purification process the amount of impurities removed from the solution is substantially equal to the amount of impurities added to the solution on each of its round trips.

In the above example the total amount of circulating hydrolyzing solution was 69.85 kilogram. The solution contained 42.7 kg. $H_3PO_4$ and the following impurities: 3.95 kg. $FePO_4$ and 9.38 kg. $AlPO_4$. During each round trip 0.07 kg. $FePO_4$ and 0.16 kg. $AlPO_4$ had to be removed. The total amount of the portion of the solution to be purified was 1.22 kg. To this portion were added 0.13 kg. $NH_3$ gas + 0.80 kg. $H_2O$ or 0.52 kg. $NH_4OH$ + 0.40 kg. $H_2O$. The addition of water is necessary to insure the solubility of the forming $NH_4H_2PO_4$ at a slightly increased temperature. By the formation of $NH_4H_2POa$ pH-value of 3.8 to 4 is attained. The use of $NH_3$ instead of $NH_4OH$ has the advantage that due to the heat of solution of the $NH_3$ a considerable temperature increase takes place the equivalence of which in the form of energy may be utilized in another phase of the process.

As a result of the neutralization of the phosphoric acid contained in the hydrolyzing solution to the stated pH-value, aluminum phosphate and iron phosphate are precipitated from the solution together with the organic impurities that the phosphates are holding by adsorption. Preferably, the precipitated compounds are filtered out in a still warm condition. The $NH_4H_2PO_2$ adhering to the filter residue is washed out of it by means of 1.25 kg. water. This quantity is sufficient to transfer all ammonium phosphate present to the filtrate. The total amount of filtrate is 3.15 kg. It contains 0.88 kg. ammonium phosphate, 2.21 kg. water and a small amount of soluble calcium phosphate. This solution was transferred to a strongly acid cation exchanger charged with hydrogen ions. $NH_4$ and Ca were deposited on the ion exchanger resin and, in turn, hydrogen ions were released. In this manner, in a continuously operating ion exchanging system a phosphoric acid may be produced which consists of 0.79 kg. $H_3PO_4$ in 2.22 kg. water.

What we claim is:

1. In a process for the manufacture of phosphoric acid comprising digesting phosphate rock with phosphoric acid to form a mother liquor containing monocalcium orthophosphate, crystallizing said monocalcium orthophosphate, separating said monocalcium orthophosphate from said mother liquor, and converting said monocalcium orthophosphate with an ion exchange resin to phosphoric acid, the improvement comprising neutralizing said mother liquor to a pH of 3.3 to 5.5 with a neutralizing agent selected from the group of ammonia and ammonium hydroxide, so that iron and aluminum are precipitated in the form of their phosphates, separating said phosphates from the mother liquor by filtration, treating the filtrate with a strongly acidic cationic exchange resin to remove ammonium and other basic ions and employing the resulting purified phosphoric acid solution for digesting additional phosphate rock.

2. A method according to claim 1, in which the increase of the pH-value in the mother liquor is effected by employing ammonium hydroxide as the neutralizing agent.

3. A method according to claim 1, in which the pH-value in the mother liquor is raised to 3.8 to 4.0.

4. A method according to claim 1, in which one part of the mother liquor is neutralized to pH 3.3 to 5.5, whereas the other part is removed and returned to the solution for treating said phosphate rock.

5. A method according to claim 1, in which the increase of the pH-value in the mother liquor is effected by employing ammonia ($NH_3$) as the neutralizing agent.

* * * * *